(12) United States Patent
Jantzen

(10) Patent No.: US 7,878,526 B1
(45) Date of Patent: Feb. 1, 2011

(54) MAGNETIC TRAILER HITCH PIN

(76) Inventor: James K. Jantzen, 433 County Rd. 10, Newbern, AL (US) 36765

( * ) Notice: Subject to any disclaimer, the term of this patent is extended or adjusted under 35 U.S.C. 154(b) by 138 days.

(21) Appl. No.: 12/239,338

(22) Filed: Sep. 26, 2008

(51) Int. Cl.
*B60D 1/02* (2006.01)

(52) U.S. Cl. ............... 280/515; 280/504; 280/507; 280/491.5

(58) Field of Classification Search ........... 280/515, 280/504, 507, 491.5
See application file for complete search history.

(56) References Cited

U.S. PATENT DOCUMENTS

| 317,421 A | 5/1885 | Simons |
| 543,087 A | 7/1895 | Ferris |
| 700,788 A | 5/1902 | Levitt et al. |
| 1,261,889 A | 4/1918 | Zukiwski |
| 2,367,874 A * | 1/1945 | Kelley ............... 411/342 |
| 2,436,210 A * | 2/1948 | Fuhrer et al. ............ 411/342 |
| 2,454,856 A * | 11/1948 | Bible ............... 411/341 |
| 2,483,111 A * | 9/1949 | Spillman ............... 411/340 |
| 2,593,453 A | 4/1952 | Honeycutt et al. |
| 2,627,423 A * | 2/1953 | Copeman ............ 280/515 |
| 2,757,021 A * | 7/1956 | Moon ............... 280/515 |
| 3,081,663 A | 3/1963 | Davis |
| 3,192,820 A | 7/1965 | Pitzer |
| 3,401,587 A | 9/1968 | Kalls |
| 3,432,197 A | 3/1969 | Albertine et al. |
| 3,865,407 A * | 2/1975 | Klassen ............ 280/515 |
| 3,998,472 A | 12/1976 | Tretter |
| D258,115 S | 2/1981 | Platek |
| 4,483,550 A | 11/1984 | Dubbe |
| 4,526,396 A * | 7/1985 | Mayer ............ 280/515 |
| 4,579,364 A | 4/1986 | Kranz |
| 4,890,854 A * | 1/1990 | Hoover ............ 280/504 |
| D395,388 S | 6/1998 | Bourne et al. |
| 5,807,019 A | 9/1998 | Meyer |
| 6,260,931 B1 | 7/2001 | Stewart |
| 7,269,868 B1 * | 9/2007 | Allin ............... 7/143 |

FOREIGN PATENT DOCUMENTS

JP 9224405 9/1997

OTHER PUBLICATIONS

Northman Exports; www.northmanexports.com/products.php.

* cited by examiner

*Primary Examiner*—Lesley Morris
*Assistant Examiner*—Marlon A Arce
(74) *Attorney, Agent, or Firm*—Angela Holt; Lanier Ford Shaver & Payne P.C.

(57) ABSTRACT

A trailer hitch pin of the present disclosure has a magnet disposed on an end of a shaft for coupling the shaft to an opening in a trailer hitch, the shaft for insertion into the opening to retain the trailer hitch in a receptacle coupled to a vehicle. In addition, the trailer hitch pin has a lever pivotally attached to the shaft for disengaging the magnet and decoupling the shaft from the opening to remove the trailer hitch from the receptacle.

4 Claims, 3 Drawing Sheets

MAGNETIC TRAILER HITCH PIN

BACKGROUND

Oftentimes, a trailer hitch is a removable hitch and is held in place on a vehicle with a hitch pin. Such hitch pins typically have either a handle on one end that is larger than the apertures of the removable hitch or a bend in the shaft to prevent the pin from sliding through the apertures, and a cotter key (also called a cotter pin) or similar locking mechanism disposed through the other end for holding the pin in place during transport. This is designed to prevent the pin from being jostled out of place during transport which would allow the trailer to come free from the vehicle.

Cotter keys are often very difficult to remove from the hitch pin, which encourages many people to disregard them and use the hitch pin with no locking mechanism to secure it in place. This is very dangerous because trailers often shift and bounce a great deal during transport, and the likelihood of losing or displacing the hitch pin becomes increasingly high as the distance traveled increases.

SUMMARY OF THE INVENTION

The present disclosure is directed to a trailer hitch pin. A trailer hitch pin in accordance with an embodiment of the present disclosure comprises a magnet disposed on an end of a shaft for coupling the shaft to an opening in a trailer hitch, the shaft for insertion into the opening to retain the trailer hitch in a receptacle coupled to a vehicle. In addition, the trailer hitch pin comprises a lever pivotally attached to the shaft for disengaging the magnet and decoupling the shaft from the opening to remove the trailer hitch from the receptacle.

These and other embodiments of the present invention will also become readily apparent to those skilled in the art from the following detailed description of the embodiments having reference to the attached figures, the invention not being limited to any particular embodiment(s) disclosed.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the figures.

DETAILED DESCRIPTION OF THE INVENTION

Figure 1:
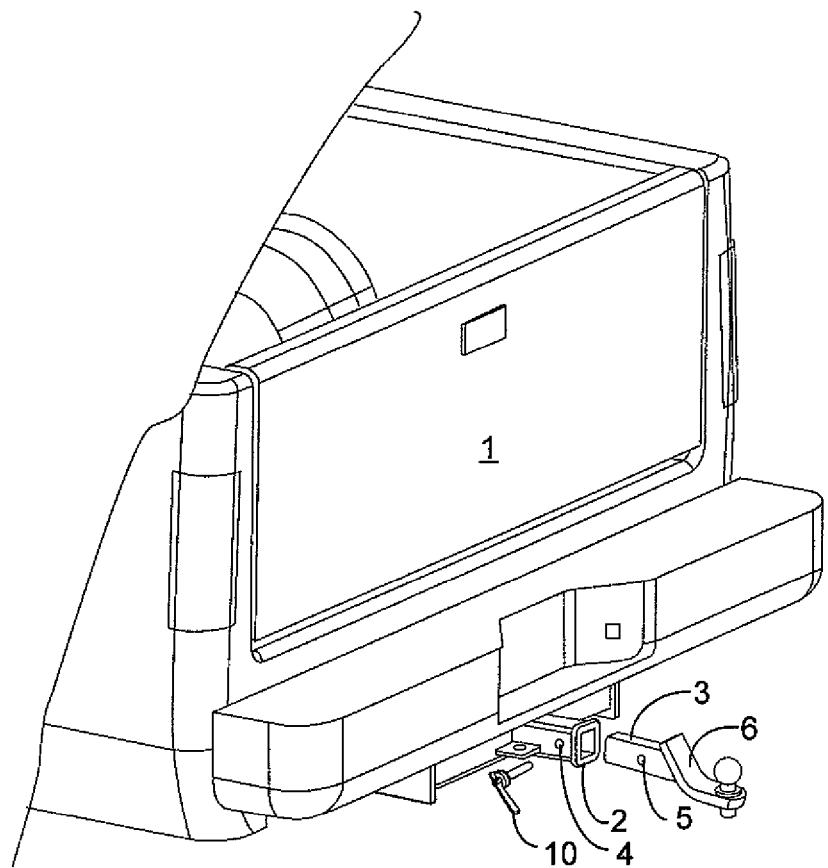
FIG. 1 depicts a perspective view of a disengaged magnetic trailer hitch pin in accordance with an embodiment of the present disclosure.

FIG. 1 depicts a magnetic hitch pin 10 in accordance with an embodiment of the present disclosure. The hitch pin 10 is illustrated in FIG. 1 in a disengaged position, i.e., not installed to secure a trailer hitch 6 to a hitch receptacle 2 on a vehicle 1. The trailer hitch 6 is secured to the vehicle 1 by inserting a male protrusion 3 of the trailer hitch 6 into the hitch receptacle 2.

When inserting the male protrusion 3 into the hitch receptacle 2, a user (not shown) manually aligns an opening 5 of the trailer hitch 6 with an opening 4 of the hitch receptacle 2. The user inserts the magnetic hitch pin 10 through the opening 4 of the hitch receptacle 2 and the opening 5 of the trailer hitch 6 in order to secure the trailer hitch 6 to the vehicle 1.

In this regard, the male protrusion 3 of the trailer hitch 6 is inserted into the hitch receptacle 2 and the opening 5 of the male protrusion 3 is manually adjustably aligned with the opening 4 of the hitch receptacle 2. The hitch pin 10 secures the trailer hitch 6 to the vehicle 1 by fitting within the opening 4 of the hitch receptacle 2 and the opening 5 of the male protrusion 3 and magnetically coupling to the outer surface of the hitch receptacle 2.

Figure 2:
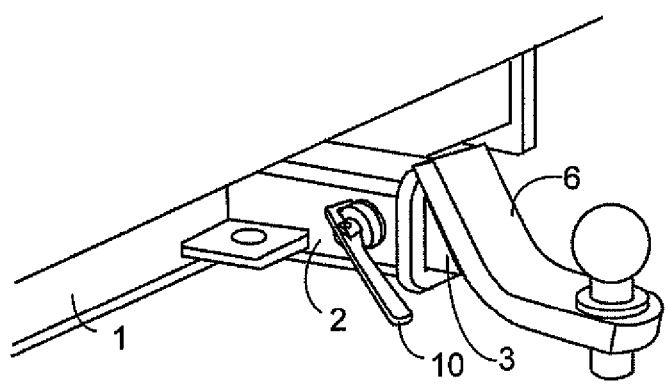
FIG. 2 depicts a perspective view of the magnetic trailer hitch pin of FIG. 1 engaged.

FIG. 2 depicts a perspective view of the magnetic trailer hitch pin 10 installed in the hitch receptacle 2 of the vehicle 1. Notably, the hitch pin 10 shown in FIG. 2 is in an engaged and locked position.

The term "engaged" refers to when the hitch pin 10 is inserted into the opening 4 (FIG. 1) and the opening 5 (FIG. 1) and the hitch pin 10 is magnetically coupled to the receptacle 2. The term "locked" refers to when the hitch pint 10 is manually actuated and positioned such that the hitch pin 10 cannot be readily removed, as described further herein.

Figure 3:
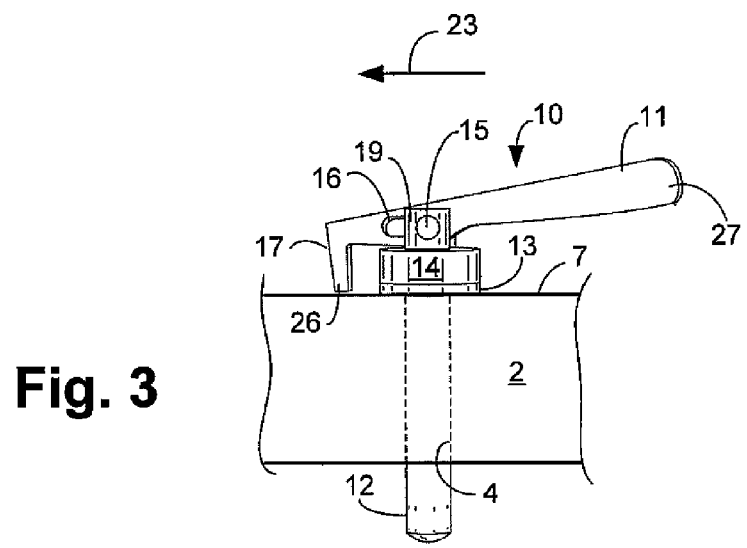
FIG. 3 depicts a side plan view of the magnetic trailer hitch pin of FIG. 1 engaged but unlocked and just prior to disengagement.

FIG. 3 depicts a side view of the magnetic trailer hitch pin 10 engaged, but unlocked and prior to disengagement. The term "unlocked" refers to when the hitch pin 10 has not been positioned such that the hitch pin cannot be readily removed.

The hitch pin 10 comprises a shaft 12, a magnet 13, a collar 14, a lever retaining pin 15, a lever retainer 19, and a lever 11. The magnet 13 is affixed to bottom of the collar 14, and the lever retainer 19 extends vertically from the top of the collar 14. The shaft 12 fits through the opening 4 of the hitch receptacle 2 and the magnet 13 couples to a surface 7 of the hitch receptacle 2.

The lever 11 comprises a lever handle 27, a sliding opening 16, a lever head 17, and a hitch-contacting portion 26. The lever 11 is coupled to the hitch pin 10 by aligning the sliding opening 16 with the lever retainer 19 and inserting a lever retaining pin 15 through both the lever retainer 19 and the lever 11.

In operation, a user (not shown) grasps the lever handle 27 and slides the lever 11 in a direction indicated by reference arrow 23, such that the magnetic trailer hitch pin 10 is unlocked. FIG. 3 depicts the magnetic hitch pin 10 unlocked.

By sliding the lever 11 in the direction indicated by reference arrow 23, the hitch-contacting portion 26 of the head 17 moves away from the collar 14 and is in contact with the surface 7 of the hitch receptacle 2. The sliding opening 16 allows the lever 11 to be slid a sufficient distance from the collar 14 in the unlocked direction indicated by reference arrow 23 for the lever 11 to be operable to disengage the pin 10 from the receptacle 2, as described further herein. The hitch-contacting portion 26 abuts the surface 7 of the hitch receptacle 2 to provide leverage for disengaging the magnet 13.

Figure 4:
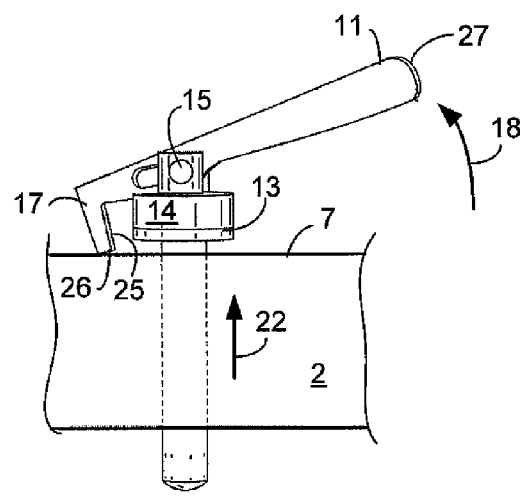
FIG. 4 depicts a side plan view of the magnetic trailer hitch pin of FIG. 1 just after disengagement.

FIG. 4 depicts a side view of the magnetic trailer hitch pin 10 as the magnetic trailer hitch pin 10 is being disengaged. When force is applied to the lever handle 27 in the pivotal direction indicated by reference arrow 18, the head 17 applies pressure to the surface 7 of the receptacle 2 in the opposite direction, such that the hitch-contacting portion 26 is pressed firmly against the surface 7 of the hitch receptacle 2. This contact creates a force on the lever retaining pin 15 (and thus on the pin 10) in a direction indicated by reference arrow 22. This force overcomes the magnetic force of the magnet 13 and causes the magnet 13 to disengage from the surface 7 of the hitch receptacle 2. The lever handle 27 can move in the pivotal direction 18 only when the lever 11 is unlocked, i.e., the user slides the lever 11 in the direction indicated by arrow 23 as depicted in FIG. 3.

Figure 5:
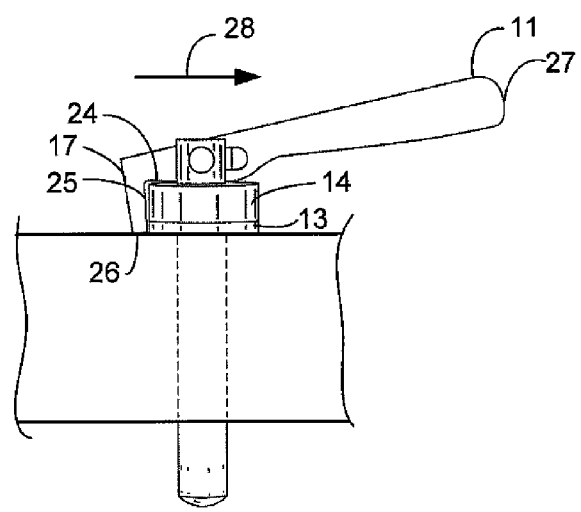
FIG. 5 depicts a side view of the magnetic trailer hitch pin of FIG. 1 engaged and locked.

FIG. 5 depicts a side view of the magnetic trailer hitch pin 10 engaged and locked. Once the magnet 13 engages the surface 7 of the hitch receptacle 2, the user (not shown) slides the lever 11 in a direction indicated by reference arrow 28. Once the user slides the lever 11 as far as the lever 11 will slide, the magnetic trailer hitch pin 10 is locked.

When the user has slid the lever 11 as far as it will go, the generally vertical collar-contacting surface 25 of the head 17 is brought into contact with the side of the collar 14 and magnet 13. Further, the generally horizontal collar-contacting surface 24 of the lever 11 is brought into contact with the top of the collar 14, and the hitch-contacting portion 26 is brought into contact with the surface 7 of the hitch receptacle 2. When the lever 11 is in this locked position, movement of the lever 11 in the direction 18 will not cause the magnet 13 to disengage.

Figure 6:
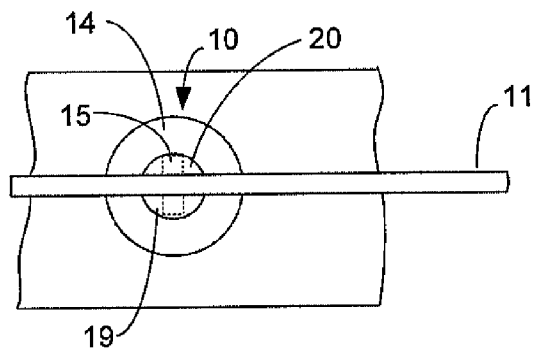
FIG. 6 depicts a top plan view of the magnetic trailer hitch pin of FIG. 1.

FIG. 6 depicts a top plan view of the magnetic trailer hitch pin 10. The lever 11 is fitted between the lever retainers 19, 20, and the lever retaining pin 15 is inserted through the lever retainers 19, 20 and the sliding opening 16 (FIG. 3) of the lever 11 to secure the lever 11 to the magnetic hitch pin 10. The lever retainers 19 and 20 are integrally formed with the collar 14 and shaft 12 in one embodiment.

Figure 7:
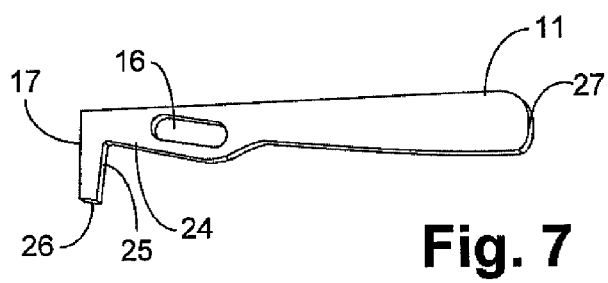
FIG. 7 depicts a side plan view of a lever of the magnetic trailer hitch pin of FIG. 1.

FIG. 7 depicts a side view of the lever 11. The lever 11 comprises the sliding opening 16, the head 17, the lever handle 27, the hitch-contacting portion 26, the generally vertical collar-contacting surface 25, and the generally horizontal collar-contacting surface 24.

The surfaces 26, 25, and 24 contact the surface 7 (FIG. 5), the side of the collar 14 (FIG. 5), and the top of the collar 14 (FIG. 5), respectively, when the lever 11 has been moved in the direction indicated by reference arrow 28 (FIG. 5) via the sliding opening 16. The contact between the surfaces 26, 27, and 24 and the surface 7, the side of the collar 14 and the top of the collar 14, respectively, ensure that the trailer hitch pin 10 remains locked, until a user actuates the lever 11 in the direction indicated by reference arrow 23 (FIG. 3).

Figure 8:
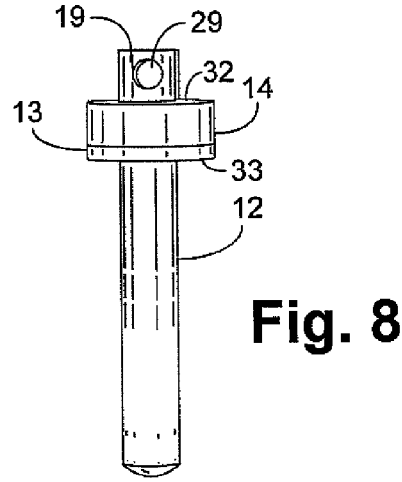
FIG. 8 depicts a side perspective view of the magnetic trailer hitch pin of FIG. 1 without the lever of FIG. 7.

FIG. 8 depicts a side perspective view of the trailer hitch pin 10 when the lever 11 is not coupled to the to the trailer hitch pin 10. The trailer hitch pin 10 has openings 29 in the lever retainers 19 and 20 (FIG. 6) through which a lever retaining pin 15 (FIG. 3) is inserted.

The lever retainers 19 and 20 are fixedly coupled to a top surface 32 of the collar 14, and the collar 14 is fixedly coupled to the magnet 13. The shaft 12 is fixedly coupled to the magnet 13, and extends from the surface 33 of the magnet 13 such that the shaft 12 can be inserted through the openings 4, 5 of the receptacle 2 and the male protrusion 3, respectively. In one embodiment, the lever retainers 19 and 20, the shaft 12, and the collar 14 are machined from a solid material, such as stainless steel or steel, and the magnet 13 is a disk-shaped cylinder that is slid onto the shaft 12 and affixed to the shaft 12 with an adhesive.

Figure 9:
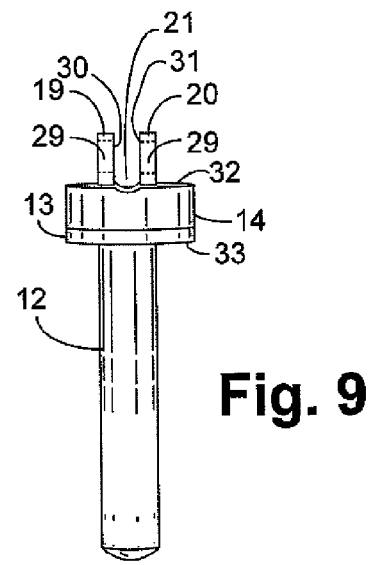
FIG. 9 depicts a front perspective view of the magnetic trailer hitch pin of FIG. 1 without the lever of FIG. 7.

FIG. 9 depicts a front perspective view of the magnetic trailer hitch pin 10 when the lever 11 is not coupled to the trailer hitch pin 10. The magnetic trailer hitch pin 10 comprises the collar 14, the magnet 13, the shaft 12, the lever retainers 19, 20, the openings 29, and a channel 21. The channel 21 is formed by inner walls 30 and 31 of the lever retainers 19, 20, respectively, contiguous with a top surface 32 of the collar 14.

The shaft 12 extends below the magnet 13, which is attached to the collar 14, and the lever retainers 19, 20 protrude from the top surface 32 of the collar 14.

The lever retaining pin 15 (FIG. 6) is inserted through the opening 29 and the sliding opening 16 (FIG. 7) of the lever 11 in order to secure the lever 11 to the hitch pin 10. The channel 21 provides a space for the lever 11 to slide between the lever retainers 19, 20.

This disclosure may be provided in other specific forms and embodiments without departing from the essential characteristics as described herein. The embodiment described is to be considered in all aspects as illustrative only and not restrictive in any manner.

What is claimed is:

1. A trailer hitch pin, comprising:
 a shaft for inserting into one or more aligned openings in a trailer hitch;
 a collar disposed on an end of the shaft;
 a magnet coupled to the collar, wherein the magnet is larger than the aligned openings in the trailer hitch, the magnet for engaging a surface of the trailer hitch when the shaft is inserted in the openings of the trailer hitch; and
 a lever coupled to the collar for disengaging the magnet from the trailer hitch when torque is applied to the lever;
 wherein the lever comprises a head, a hitch-contacting portion, a sliding opening, and a lever handle, wherein the hitch-contacting portion is located on the head, and wherein the head is located on the opposite end of the lever from the lever handle.

2. The trailer hitch pin of claim 1, wherein the lever is positioned in such a way as to disengage the magnet from the surface of the trailer hitch when sufficient torque is applied to the lever handle by engaging the surface of the trailer hitch with the hitch-contacting portion of the lever and applying upward force on the hitch pin.

3. The trailer hitch pin of claim 2, further comprising a lever retainer extending from the collar, wherein the lever retainer forms a channel for receiving the lever and slidably and pivotally securing the lever to the collar.

4. The trailer hitch pin of claim 3, wherein the lever retainer has an opening for receiving a lever retaining pin and the lever retainer pin is inserted through the opening and a sliding opening in the lever when the opening and the sliding opening are aligned.

* * * * *